United States Patent
Zhang et al.

(10) Patent No.: US 10,277,131 B2
(45) Date of Patent: Apr. 30, 2019

(54) CONTROL CIRCUITS AND CONTROL METHODS FOR POWER CONVERTERS

(71) Applicant: SEMICONDUCTOR COMPONENTS INDUSTRIES, LLC, Phoenix, AZ (US)

(72) Inventors: Guangchao Zhang, San Jose, CA (US); Mao-Sheng Lin, New Taipei (TW); Chen-Hua Chiu, New Taipei (TW); HyeongSeok Baek, Gyeonggi-do (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 17 days.

(21) Appl. No.: 15/673,712

(22) Filed: Aug. 10, 2017

(65) Prior Publication Data

US 2018/0054109 A1    Feb. 22, 2018

Related U.S. Application Data

(60) Provisional application No. 62/376,922, filed on Aug. 19, 2016.

(51) Int. Cl.
*H02M 1/36* (2007.01)
*H02M 3/335* (2006.01)
*H02M 1/00* (2006.01)

(52) U.S. Cl.
CPC ......... *H02M 3/33507* (2013.01); *H02M 1/36* (2013.01); *H02M 2001/0025* (2013.01); *H02M 2001/0035* (2013.01)

(58) Field of Classification Search
CPC . H02M 2001/0025; H02M 2001/0035; H02M 1/36; H02M 3/156; H02M 3/335; H02M 3/33507
See application file for complete search history.

(56) References Cited

U.S. PATENT DOCUMENTS

2007/0195559 A1*   8/2007   Gong ................. H02M 3/33507
                                                            363/21.01
2010/0039836 A1*   2/2010   Gong .................... H02M 3/156
                                                            363/21.13

(Continued)

OTHER PUBLICATIONS

Fairchild Semiconductor Corporation, "FAN501 Offline DCM / CCM Flyback PWM Controller for Charger Applications," Apr. 2014.

(Continued)

*Primary Examiner* — Fred E Finch, III
(74) *Attorney, Agent, or Firm* — Brake Hughes Bellermann LLP

(57) ABSTRACT

In a general aspect, a control circuit for a power converter can include an option selector circuit that is coupled with a detection pin. The option selector can, based on a voltage applied to the detection pin being greater than or less than a threshold voltage, respectively generate a first enable signal or generate a second enable signal. The control circuit can also include a first mode controller coupled with the option selector and the detection pin. The first mode controller can be configured to, in response to receiving the first enable signal, operate the power converter in a first mode of operation. The control circuit can further include a second mode controller coupled with the option selector and the detection pin. The second mode controller can being configured to, in response to receiving the second enable signal, operate the power converter in a second mode of operation.

20 Claims, 9 Drawing Sheets

(56) References Cited

U.S. PATENT DOCUMENTS

| | | | | |
|---|---|---|---|---|
| 2010/0219802 A1* | 9/2010 | Lin | H02M 3/33507 323/284 |
| 2011/0305047 A1* | 12/2011 | Jungreis | H02M 1/08 363/21.02 |
| 2012/0092900 A1* | 4/2012 | Orr | H02M 1/4208 363/21.03 |
| 2012/0113689 A1* | 5/2012 | Chen | H02M 3/33523 363/21.17 |
| 2013/0193940 A1* | 8/2013 | Louvel | H02M 3/33523 323/282 |
| 2014/0097814 A1* | 4/2014 | Brewster | H02M 3/156 323/282 |
| 2015/0244274 A1* | 8/2015 | Fahlenkamp | H02M 3/33507 363/21.15 |
| 2015/0333630 A1* | 11/2015 | Pastore | H02M 3/33507 363/21.17 |
| 2017/0070142 A1* | 3/2017 | Sundararaj | H02M 3/156 |
| 2017/0104405 A1* | 4/2017 | Pfof | H02M 1/32 |
| 2017/0149341 A1* | 5/2017 | Okayama | H02M 3/33553 |
| 2017/0302186 A1* | 10/2017 | Kikuchi | H02M 1/08 |
| 2018/0041129 A1* | 2/2018 | Sugahara | H02M 3/315 |

OTHER PUBLICATIONS

Fairchild Semiconductor Corporation, "FAN6604 Highly Integrated Green-Mode PWM Controller," Jan. 2015.

Fairchild Semiconductor Corporation, "FAN6755W / FAN6755UW mWSaver™ PWM Controller," May 2013.

Fairchild Semiconductor Corporation, "FSL306LRN Green Mode Fairchild Buck Switch," Oct. 2013.

Fairchild Semiconductor Corporation, "FSL336LR Green Mode Fairchild Buck Switch," Jan. 2015.

\* cited by examiner

CONTROL CIRCUITS AND CONTROL METHODS FOR POWER CONVERTERS

CROSS-REFERENCE TO RELATED APPLICATION

This application claims priority to and the benefit of U.S. Provisional Application No. 62/376,922, filed Aug. 19, 2016, entitled "CONTROL METHOD FOR POWER CONVERTER AND CONTROL CIRCUIT THEREFOR", which is hereby incorporated by reference in its entirety.

TECHNICAL FIELD

This disclosure is directed to approaches for power conversion, and more particularly, to methods and control circuits for a power converter in which a burst-mode threshold is set and a detecting function is performed using a single signal pin of a control circuit.

BACKGROUND

Power conversion apparatuses (power converters) are typically used in converting high-level and unregulated input voltages (e.g., high voltages) into output voltages with low levels (e.g., low voltages) and good stability that are suitable for use in various types of electronic devices. Accordingly, such power conversion apparatuses are widely applicable for implementation in electronic devices, such as computers, office automation equipment, industrial control equipment and communication instruments.

Such power converters can include a control circuit, which can be implemented as an integrated circuit (IC) chip, a transformer, and can also include other circuit elements (e.g., resistors and capacitors). The control circuit of a given power converter can adjust a current of a primary-side winding of the transformer using a pulse width modulation (PWM) signal and a switch unit, so as to regulate an output voltage of the power converter. The control circuit can further detect an input voltage and the output voltage, determine their relationship to one another, and then adjust the PWM signal appropriately to achieve a desired correspondence between the input voltage and the output voltage. In some instances, it can be desirable for a control chip of a power converter to include or perform additional functions. However, adding such additional functionality can increase the complexity and/or size (e.g., package size) of a corresponding control chip, which can be undesirable from a design and/or manufacturing cost standpoint.

SUMMARY

In a general aspect, a control circuit for a power converter can include a detection pin and an option selector circuit coupled with the detection pin. The option selector circuit can be configured, based on a voltage applied to the detection pin, to generate a first enable signal when the voltage applied to the detection pin is greater than a threshold voltage, and generate a second enable signal when the voltage applied to the detection pin is less than the threshold voltage. The control circuit can also include a first mode controller coupled with the option selector circuit and the detection pin. The first mode controller can be configured to, in response to receiving the first enable signal from the option selector circuit, operate the power converter in a first mode of operation. The control circuit can further include a second mode controller coupled with the option selector circuit and the detection pin. The second mode controller can be configured to, in response to receiving the second enable signal from the option selector circuit, operate the power converter in a second mode of operation.

BRIEF DESCRIPTION OF THE DRAWINGS

The accompanying drawings are included to provide a further understanding of the implementations described herein, and are incorporated in, and constitute a part of this specification.

DETAILED DESCRIPTION

Figure 1:
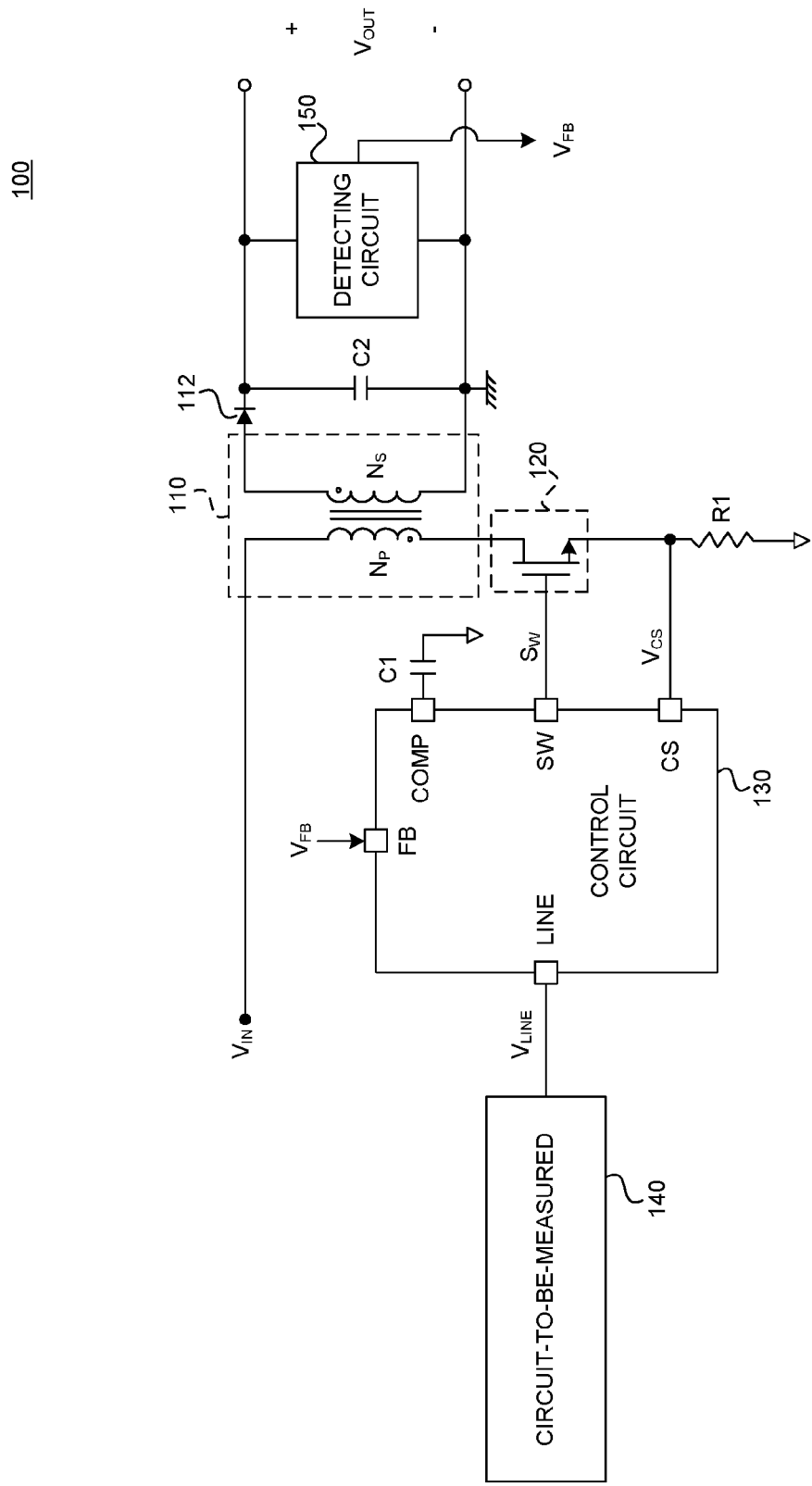
FIG. 1 is a schematic block diagram illustrating a power converter, according to an implementation.

This disclosure describes implementations of control circuits (control chips) and associated control methods for power converters. Implementations of power converter control circuits described herein can be configured to perform additional functions, e.g., in addition to controlling a PWM signal for regulating an output voltage of a power converter. Such additional functions can include setting a burst-mode threshold of the power converter. The burst-mode threshold can be used to determine when there is a specific load (e.g., in certain implementations, no load (or a light load)) coupled with an output voltage terminal of the power converter and, in response, disable (temporarily disable) the control circuit (and an associated) switching circuit.

Using the approaches described herein, such additional functionality can be included in a control chip of a power converter without increasing a number of signal pins (signal leads, terminals, etc.) of the control circuit chip, as compared to a control chip that does not perform such functions or includes additional signal pins to support such functionality. In addition, various types of circuits can be coupled to the control circuit in different, respective configurations, where the control circuit can measure one or more parameters of such circuits and use those parameters to flexibly control the associated power converter.

In a general aspect, control methods for a power converter are disclosed. These control methods can be implemented by a control circuit of the power converter. In implementations, such control methods can include the following operations. A voltage at a detection pin of the control circuit can be received and detected by the control circuit. Based on the detected voltage, a determination can be made whether to enter a first mode of operation (e.g., the detected voltage is above an option threshold voltage) or a second mode of operation (e.g., the detected voltage is below the option threshold voltage) after powering on the control circuit.

When entering the first mode of operation (e.g., the detected voltage is above the option threshold voltage), a default voltage of an electrical element connected to the detection pin is sampled, where the default voltage is different from the detected voltage and the default voltage is larger than a maximum value of an attenuated input voltage of the power converter. A value of a burst-mode threshold of the power converter can be selected and stored in response to the sampled default voltage, where the burst-mode threshold is used to determine when a specific load (e.g., in certain implementations, no load (or a light load)) condition is present at an output voltage terminal of the power converter and, in response, disable (temporarily disable) the control circuit (and an associated) switching circuit (e.g., stop switching the switching circuit). Additionally, a detecting function (e.g., a different detecting function than detecting the voltage at the detection pin when the control circuit is powered on) can be performed using the detection pin after the default voltage is sampled.

When entering the second mode of operation (e.g., the detected voltage at power up is below the option threshold voltage) a current generated by a current source can be directed to the detection pin. The current can be used to obtain (determine) an impedance voltage across an impedance element coupled with the detection pin. A second mode controller can then determine a value of a burst-mode threshold (e.g., for the power converter 100) based on the impedance voltage. The second mode controller can store the determined value of the burst-mode threshold to setup the burst-mode threshold for an associated power converter, and then dynamically adjust (e.g., based on the impedance voltage) a value of the burst-mode threshold in the power converter.

In another general aspect, control circuits of a power converter are disclosed. In implementations, a control circuit can include an option selector, a first mode controller and a switching signal control circuit. The option selector can be coupled to a detection pin of the control circuit. The first mode controller can be coupled to the option selector and the detection pin. The switching signal control circuit can be coupled to the first mode controller, and the switching signal control circuit can be used to generate a switching signal to control a current of the primary-side winding of the transformer. The option selector can receive a detected voltage applied to a detection pin, and the detected voltage can be used to determine whether the first mode of operation is entered after powering on the control circuit (e.g., the detected voltage is above the option threshold voltage), where the option selector enables the first mode controller when entering the first mode. The first mode controller can be configured to sample a default voltage of an electrical element connected to the detection pin while the first mode controller is enabled, select and store a value of a burst-mode threshold of the power converter in response to the sampled default voltage, and perform a detecting function with the detection pin after sampling the default voltage. The default voltage can be different from the detected voltage, the default voltage can be larger than a maximum value of an attenuated input voltage of the power converter, the burst-mode threshold can be used to determine that a specific load condition is present at an output terminal of the power converter, and the switching signal control circuit can adjust the switching signal (e.g., start or stop the switching signal) according to the value of the burst-mode threshold and the output voltage.

The control circuit can also include a second mode controller that is coupled to the option selector and the detection pin. The option selector can receive a detected voltage applied to a detection pin, and the detected voltage can be used to determine whether the second mode of operation is entered after powering on the control circuit (e.g., the detected voltage is below the option threshold voltage), where the option selector enables the second mode controller when entering the second mode of operation. Functions of the second mode of operation, such as those described above, can be performed using the second mode controller.

Control methods for a power converter and control circuits for implementing those control methods, such as described herein, in implementations, can be used to choose operating modes by detecting a voltage applied to a detection pin, perform additional function(s) for setting a burst-mode threshold without increasing a number of pins of the control circuit chip, and still perform the detecting function of the input voltage with the detection pin and a line detection circuit after the burst-mode threshold is set. In some implementations, different circuits can be coupled to the control circuit in different configurations, where the control circuit can measure one or more parameters of such circuits and use such parameters to flexibly control the power converter.

In order to make the aforementioned and other features and advantages more comprehensible, several implementations are described in conjunction with the various figures, which are described in detail below.

FIG. 1 is a schematic block diagram illustrating a power converter 100 (e.g., a flyback power converter), according to an implementation. Referring to FIG. 1, the power converter 100 includes a transformer 110, a diode 112, a switch unit 120, a control circuit 130 and a circuit-to-be-measured 140 (which is referred to herein as a measurement circuit). The power converter 100 further includes a detecting circuit 150 for detecting an output voltage Vout. The transformer 110 includes a primary winding Np and a secondary winding Ns. One node of the primary winding Np of the transformer 110 receives an input voltage Vin, and the secondary winding Ns of the transformer 110 generates an output voltage Vout. The control circuit 130 is disposed at (coupled with) the primary side of the transformer 110, and the control circuit 130 controls and switches the switch unit 120 to control current in the primary winding Np by using the switching signal Sw (e.g., a pulse width modulation (PWM) signal). A capacitor C2 is used to maintain stability of the output voltage Vout. The diode 112 is coupled between the secondary winding Ns and the capacitor C2 to suppress voltage spikes from a load coupled with the power converter from feeding back into the power converter 100. A first node of the switch unit 120 is coupled to the primary winding Np, a second node of the switch unit 120 is coupled to a resistor R1 to generate a sensing signal Vcs, and a control node of the switch unit 120 receives the switching signal Sw.

In the power convertor 100 of FIG. 1, the control circuit 130 can be implemented by an integrated circuit (IC) chip (a packaged IC), where the IC chip includes various pins, such as a detection pin LINE, a compensation terminal pin COMP, a switching terminal pin SW, a feedback terminal pin FB and a sensing terminal pin CS, etc. In the power converter 100, the detection pin LINE of the control circuit 130 can also be referred to as a line terminal pin or a multi-function pin, and the detection pin LINE can be connected to the circuit-to-be-measured 140. The feedback terminal pin FB of the control circuit 130 can receive a feedback signal $V_{FB}$ from the detecting circuit 150, the switching terminal pin SW can generate a switching signal Sw, the compensation terminal pin COMP can be coupled to a capacitor C1, and the sensing terminal pin CS can receive the sensing voltage Vcs at a second node of the switch unit 120. The circuit structure of the circuit-to-be-measured 140 can vary according to the specific implementation of the power converter 100, such as those implementations described herein, though other configurations of the circuit-to-be-measured 140 are possible. The detecting circuit 150 can generate the feedback signal $V_{FB}$ according to the output voltage Vout, and the feedback signal $V_{FB}$ may be transmitted to the control circuit 130.

Figure 2:
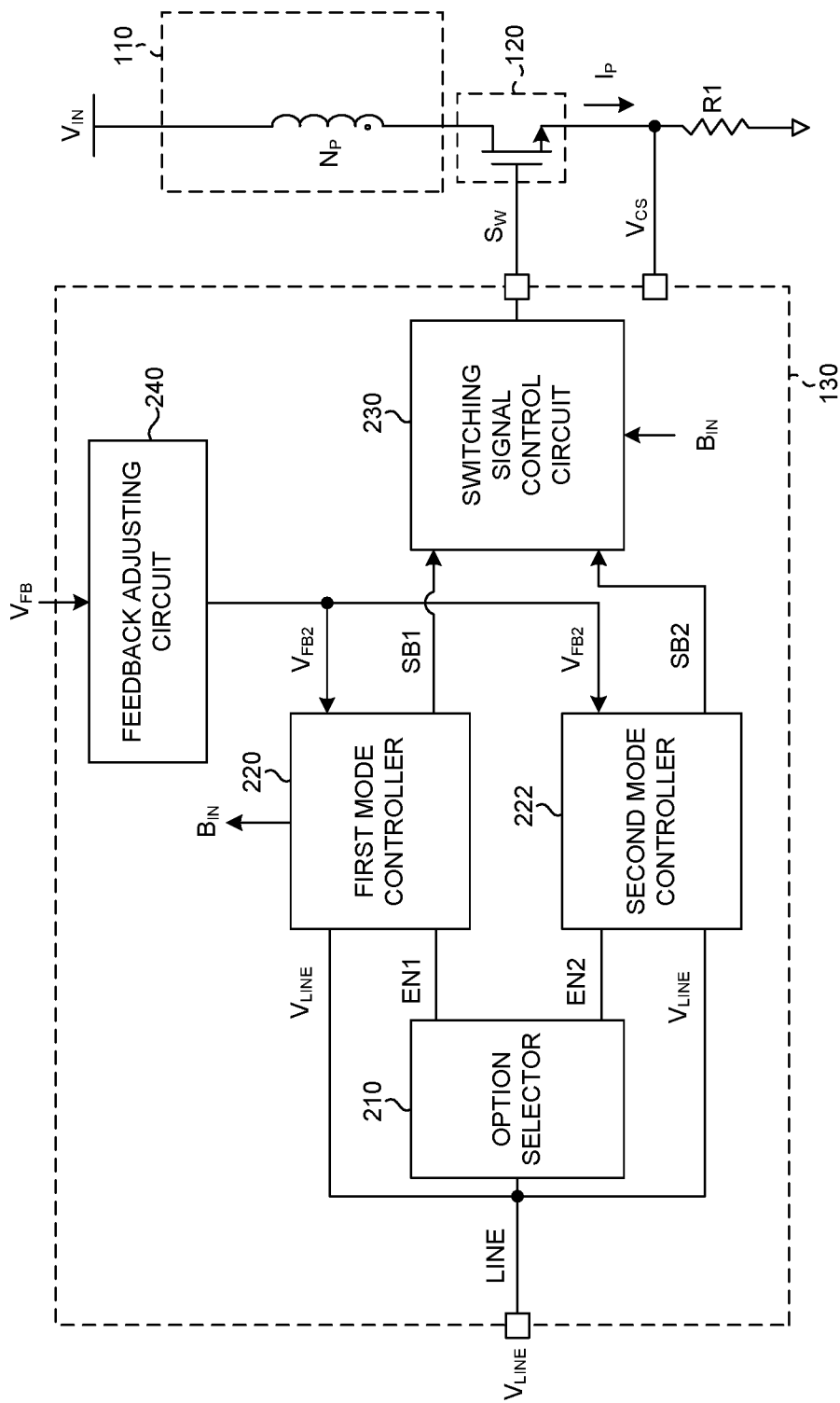
FIG. 2 is a schematic block diagram illustrating a control circuit that can be implemented in the power converter of FIG. 1.

FIG. 2 is a schematic block diagram illustrating a control circuit that can be implemented as the control circuit 130 of the power converter 100 of FIG. 1. As shown in FIG. 2, the control circuit 130 includes an option selector 210, a first mode controller 220, a second mode controller 222 and a switching signal control circuit 230. The control circuit 130 in FIG. 2 further includes a feedback adjusting circuit 240. As shown in FIG. 2, the option selector 210 is coupled to the detection pin LINE of the control circuit 130. The first mode controller 220 and the second mode controller 222 are coupled to the option selector 210 and the detection pin LINE. The switching signal control circuit 230 is coupled to the first mode controller 220 and the second mode controller 222. The switching signal control circuit 230 can be used to generate the switching signal Sw to control a current Ip through the primary-side winding Np of the transformer 110 with the switch unit 120, and adjust the switching signal Sw according to a burst control signal SB1 generated by the first mode controller 220 and a burst control signal SB2 generated by the second mode controller 222.

Figure 3:
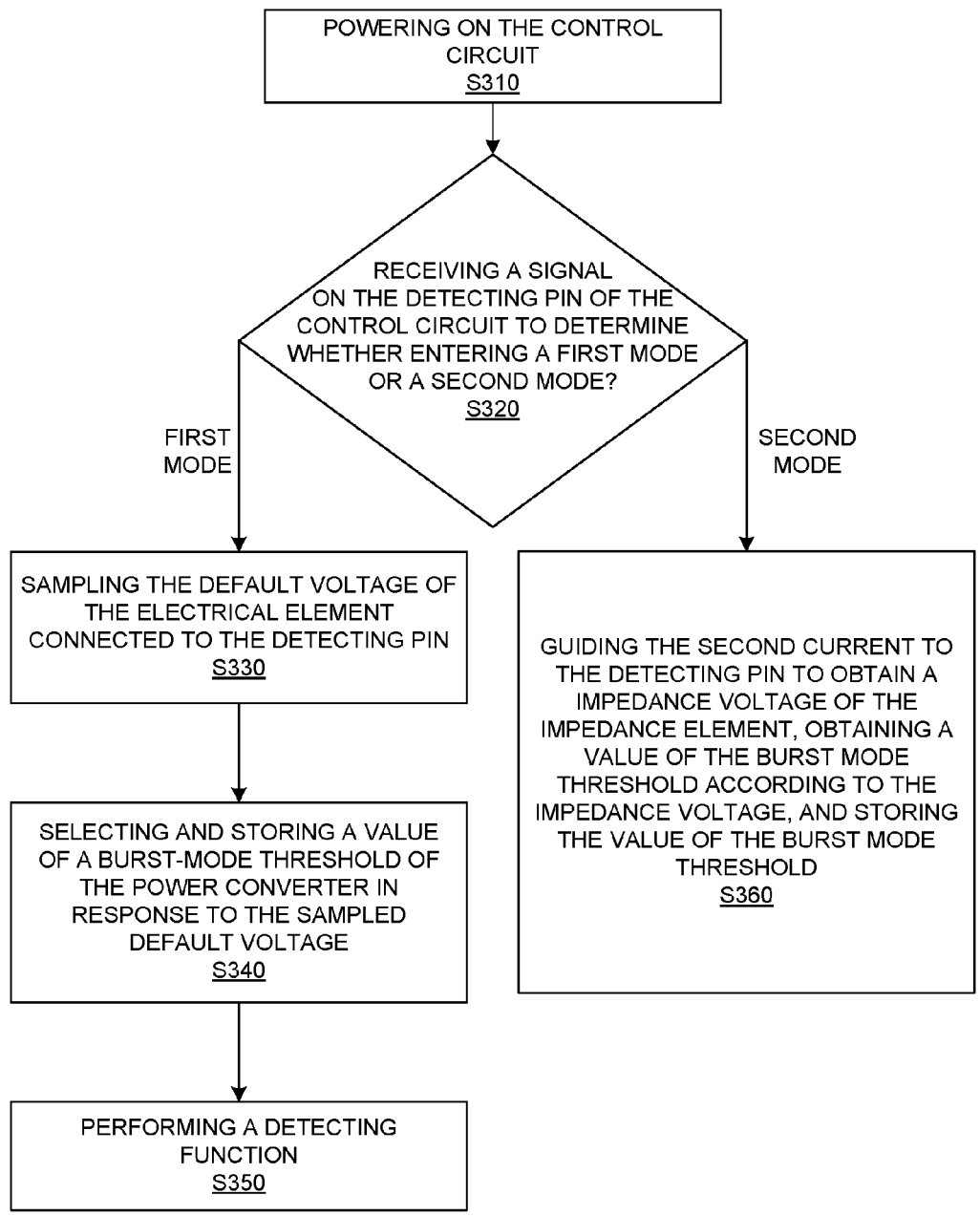
FIG. 3 is a flowchart illustrating a control method that can be implemented in the power converter of FIG. 1.

FIG. 3 is a flowchart illustrating a control method that can be implemented in the power converter 100 of FIG. 1. With reference to FIGS. 2 and 3, in step S310, the control circuit 130 of the power converter 100 is powered on. After powering on the control circuit 130, step S320 is performed, and the option selector 210 of the control circuit 130 receives a detected voltage $V_{LINE}$ at the detection pin LINE to determine whether to enter a first mode of operation or a second mode of operation. The option selector 210 can determine whether the detected voltage $V_{LINE}$ is larger than an option threshold value $V_{THO}$ to determine whether to enter the first mode of operation. Depending on the implementation, the circuit-to-be-measured 140 can be configured to allow the control circuit 130 to selectively determine whether to enter the first mode of operation or the second mode of operation based on the detected voltage.

Figure 4:
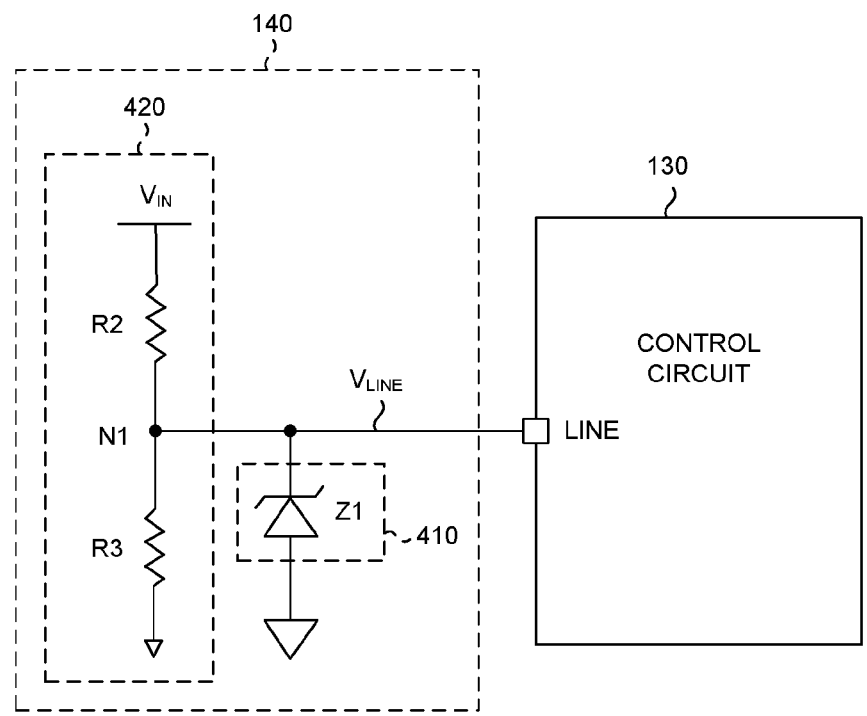
FIG. 4 is a circuit schematic diagram illustrating a circuit-to-be-measured in a first operating mode that can be implemented in the power converter of FIG. 1.
Figure 6:
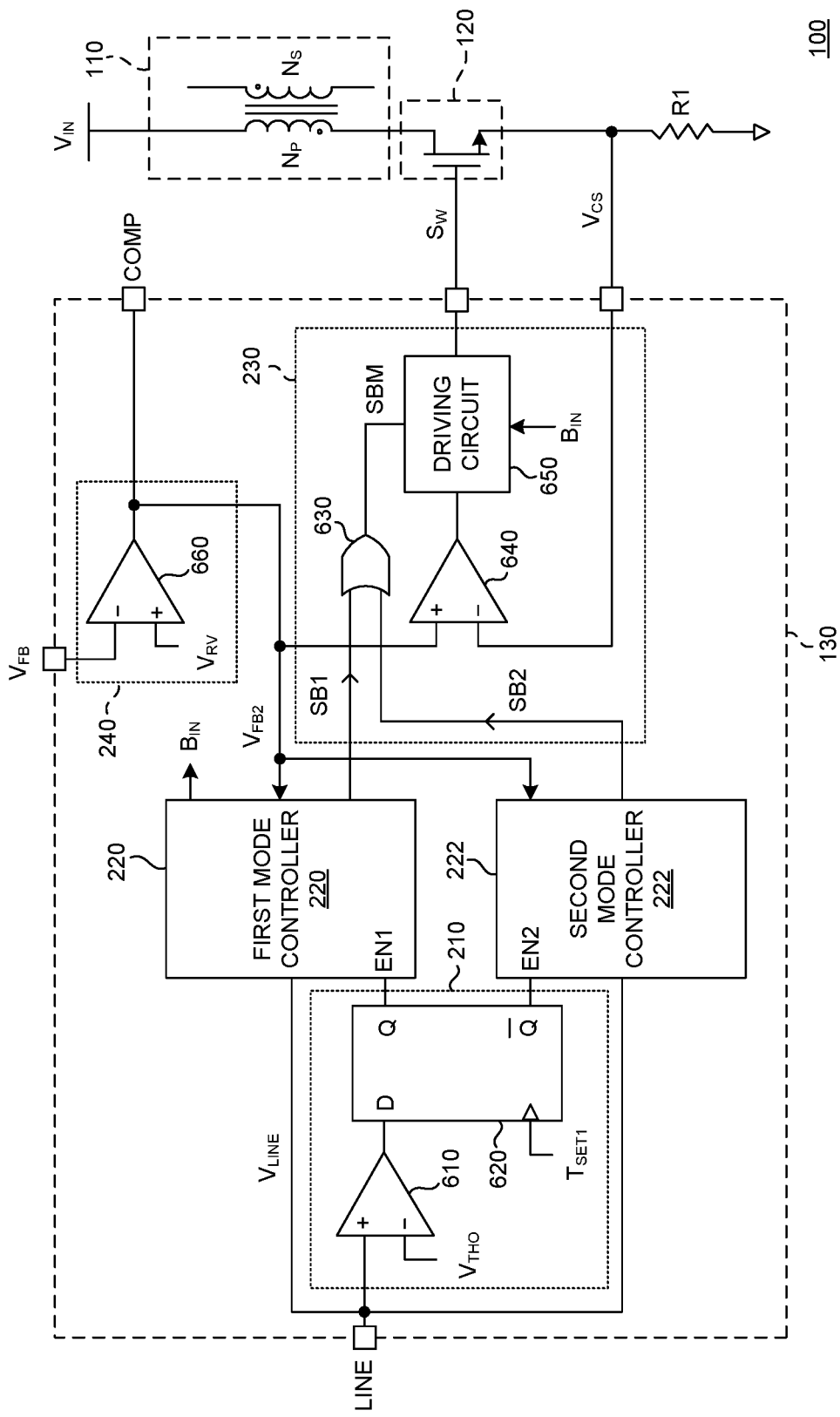
FIG. 6 is a circuit diagram illustrating an option selector, a switching signal control circuit and a feedback adjusting circuit that can be implemented in the control circuit of FIG. 2.

FIG. 4 is a circuit schematic diagram illustrating a circuit that can be implemented as the circuit-to-be-measured 140 of the power converter 100 of FIG. 1, e.g., in the first mode of operation. Referring to FIG. 4, the circuit-to-be-measured 140 includes an electrical element 410 and a divider circuit 420. In the embodiment shown in FIG. 4, the electrical element 410 is implemented with a zener diode Z1, and the divider circuit 420 is implemented with resistors R2 and R3. One node of the resistor R2 can receive an input voltage Vin, while the other node of the resistor R2 is connected to one node of the resistor R3 to define an output node N1 of the divider circuit 420. As shown in FIG. 4, the other node of the resistor R3 is coupled to a ground terminal. The output node N1 is coupled to the zener diode Z1 and the detection pin LINE of the control circuit 130. After powering on the control circuit 130, the output node N1 has an initial detected voltage $V_{LINE}$ applied to it, where the voltage $V_{LINE}$ is the input voltage Vin divided by the divider circuit 420. Referring to FIG. 2 and FIG. 4, when the detected voltage $V_{LINE}$ is larger than an option threshold value $V_{THO}$ of the control circuit 130 (e.g., as shown in FIG. 6), the option selector 210 of FIG. 2 can enable a first enable signal EN1 to enable or power on the first mode controller 220, so as to enter the first mode of operation.

Figure 7:
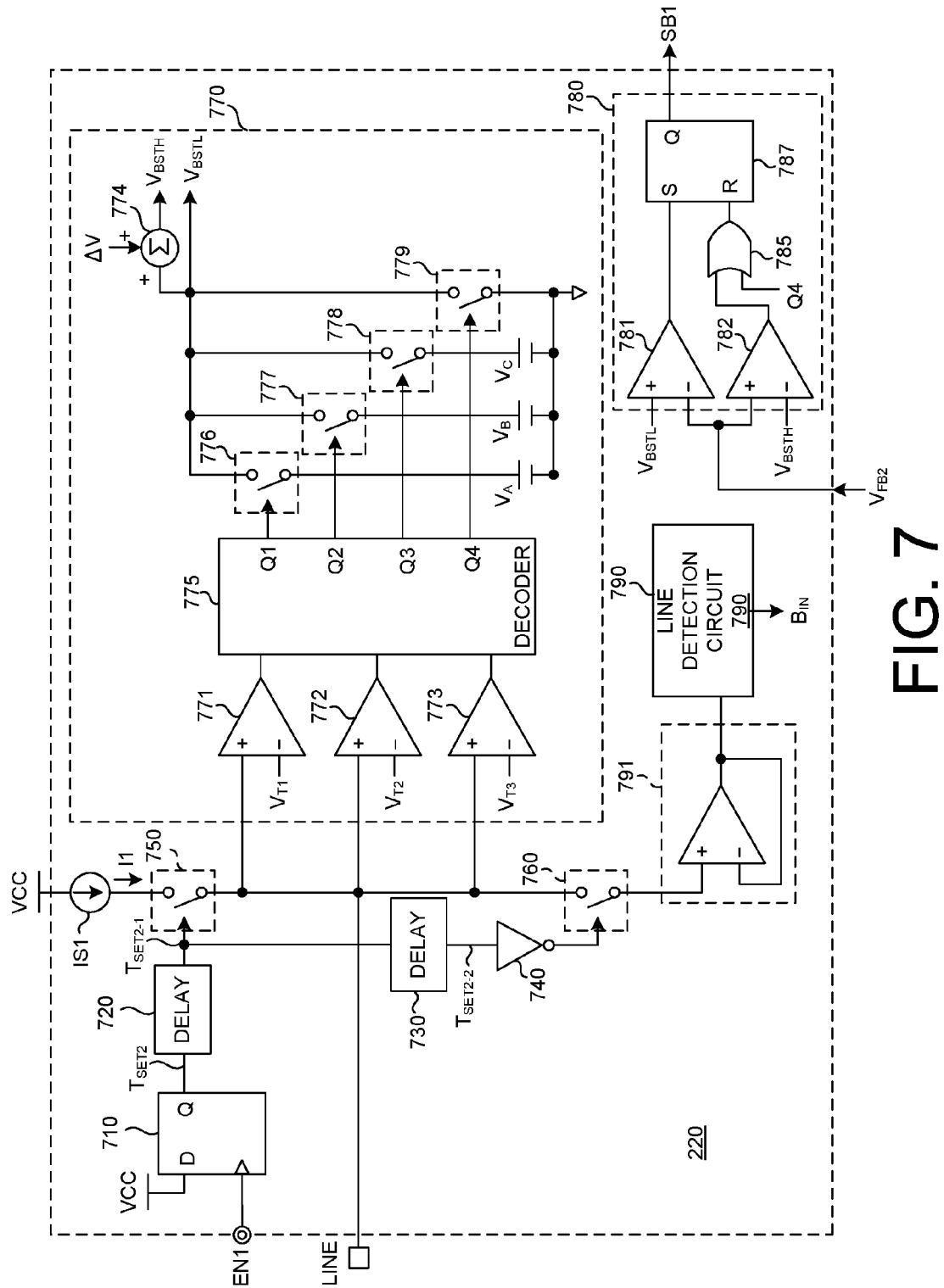
FIG. 7 is a circuit diagram illustrating a first mode controller that can be implemented in the control circuit of FIG. 2.

Referring to FIG. 3 and FIG. 4, steps S330-S350 are operating procedures in the first mode of operation, and can be implemented by the first mode controller 220 in FIG. 2. In step S330, the first mode controller 220 can sample a default voltage of the electrical element (zener diode Z1) 410 connected to the detection pin LINE. In the implementation shown in FIG. 4, the default voltage is different from the detected voltage $V_{LINE}$ obtained after powering on the control circuit 130, and the default voltage is larger than a maximum value of an attenuated input voltage Vin(dv) of the power converter 100. For instance, a system voltage VCC of the first mode controller 220 can be larger than a breakdown voltage Vz of the zener diode Z1 (electrical element 410) connected to the detection pin LINE. A first current I1 provided by a current source IS1 (e.g., as shown in FIG. 7) can be used to limit (control, etc.) a maximum current flowing through the zener diode Z1. In this way, the first mode controller 220 of the control circuit 130 can detect a voltage of the detection pin LINE when the zener diode Z1 breaks down, so as to determine the default voltage (breakdown voltage Vz) of the electrical element 410 (the zener diode Z1). In other words, the aforementioned default voltage sampled on the detection pin LINE, in this implementation, is the breakdown voltage Vz of the zener diode Z1. In implementations, zener diodes with breakdown voltages Vz that are larger than the maximum value of the attenuated input voltage Vin(dv) can be used.

In step S340, the first mode controller 220 can select and store a value of a burst-mode threshold of the power converter in response to the sampled default voltage. The burst-mode threshold can be used to determine that a specific load condition is present at an output terminal of the power converter, and the switching signal control circuit can adjust the switching signal SW (e.g., start or stop the switching signal) based on this determination. In step S350, after sampling the default voltage, the first mode controller 220 can perform a detecting function with the detection pin LINE. Therefore, the first mode controller 220 in FIG. 2 may set the value of the burst-mode threshold when the control circuit 130 is powered on, and then perform the detecting function. As one example, the detecting function may be dynamically determining (monitoring) the input voltage Vin with the detection pin LINE after the burst-mode threshold is setup (established, determined, etc.). Accordingly, the function of setting the burst mode threshold and the detecting function for the input voltage Vin can be implemented by the control circuit 130 using a single pin (e.g., the detection pin LINE) of the control circuit 130.

Figure 5:
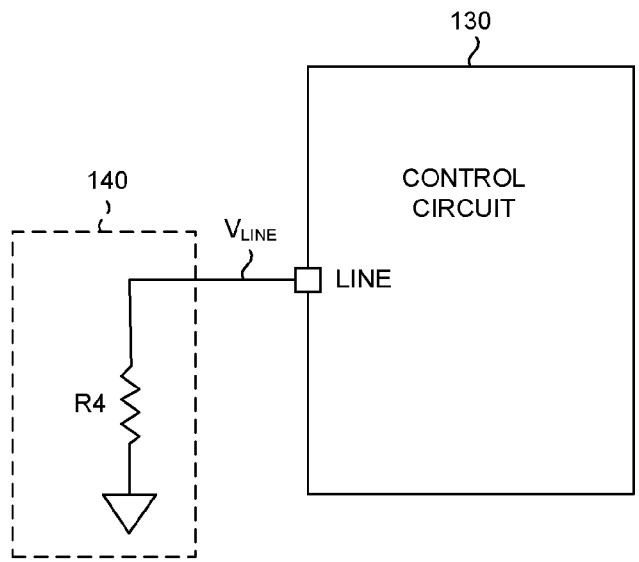
FIG. 5 is a circuit schematic diagram illustrating a circuit-to-be-measured in a second operating mode that can be implemented in the power converter of FIG. 1.

FIG. 5 is a circuit schematic diagram illustrating another circuit that can be implemented as the circuit-to-be-measured 140 of the power converter of FIG. 1, e.g., in the second mode of operation. Referring to FIG. 5, when in the second mode of operation, the circuit-to-be-measured 140 connected to the detection pin LINE can include an impedance element (e.g., the resistor R4). As shown in FIG. 5, a first node of the resistor R4 is coupled to the detection pin LINE, and a second node of the resistor R4 is coupled to a ground terminal. In the circuit of FIG. 5, after powering on the control circuit 130, a value of an initial detected voltage $V_{LINE}$ applied to the detection pin LINE is at or near zero (e.g., below the option threshold voltage $V_{THO}$) because the second node of the resistor R4 is connected to the ground terminal. Referring to FIG. 2, FIG. 3 and FIG. 5, in step S320 of FIG. 3, when the detected voltage $V_{LINE}$ (e.g., zero in this example) is not larger than the option threshold voltage $V_{THO}$, the option selector 210 of FIG. 2 can enable a second enable signal EN2 to enable or power on the second mode controller 222, so as to enter the second mode of operation to execute step S360.

Figure 9:
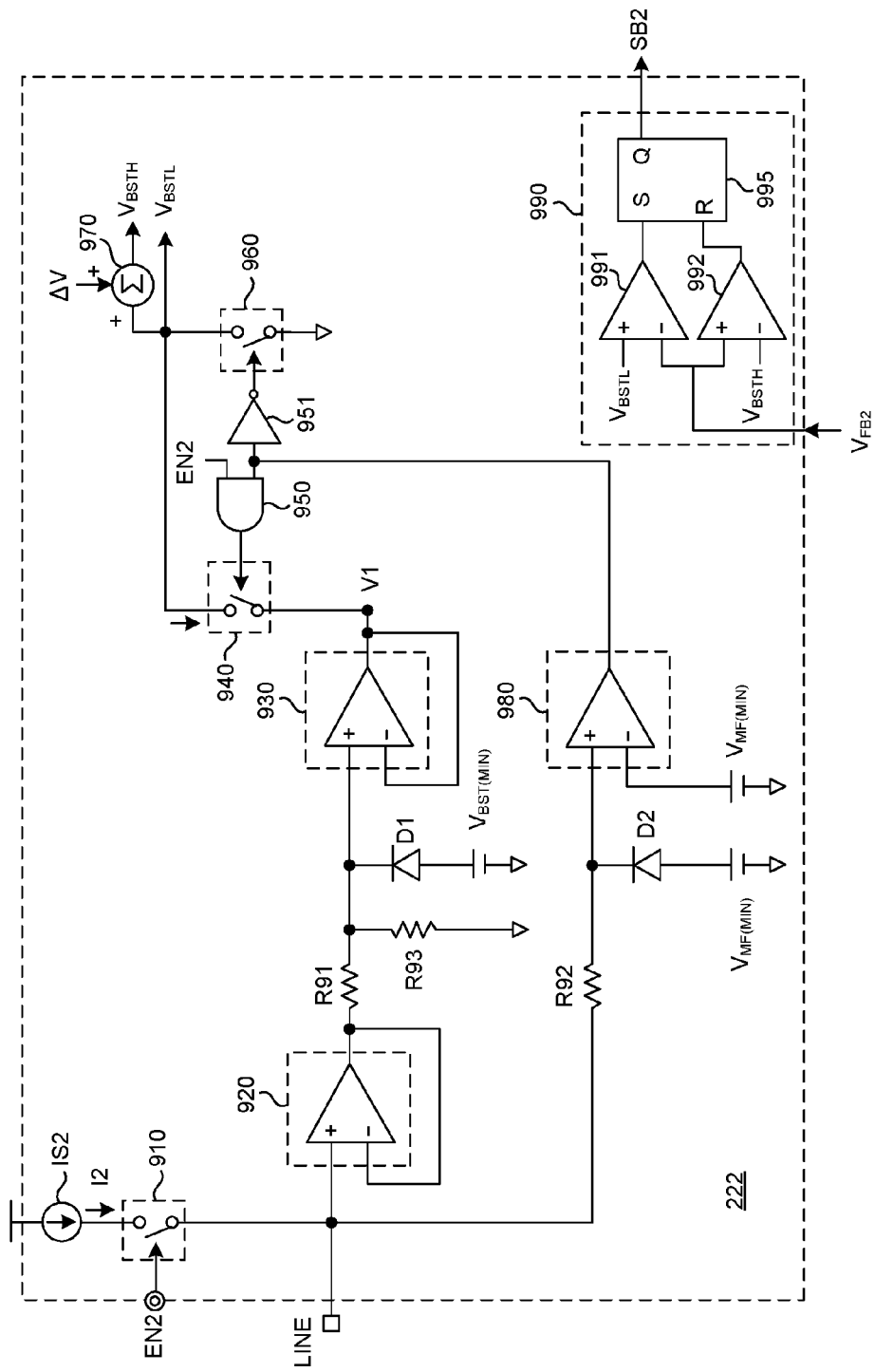
FIG. 9 is a circuit diagram illustrating a second mode controller that can be implemented in the control circuit of FIG. 2.

Referring now to FIG. 2, FIG. 3 and FIG. 5, step S360 is an operating procedure in the second mode of operation, which can be implemented using the second mode controller 222 in FIG. 2. In step S360, the second mode controller 222 can guide a second current I2 generated by a second current source IS2 through a switch 910 (controlled by the second enable signal EN2 as shown in FIG. 9), to the detection pin LINE, so as to obtain an impedance voltage across the impedance element (the resistor R4) on the detection pin LINE. The value of the impedance voltage is a value of the impedance of the resistor R4 multiplied by the value of the second current I2 (e.g., from Ohm's Law). The second mode controller 222 can then determine a value of a burst-mode threshold (e.g., for the power converter 100) based on the impedance voltage. The second mode controller 222 can store the determined value of the burst-mode threshold to setup the burst-mode threshold for the power converter 100. Accordingly, if the detecting function for the input voltage Vin with the detection pin LINE (of the first mode of operation) will not be performed, the circuit-to-be-measured 140 in the power converter 100 can be implemented as a single resistor, from which the impedance voltage can be used to adjust (e.g., dynamically adjust) the value of the burst-mode threshold in the power converter 100 without using the detecting function for the input voltage Vin with the detection pin LINE.

FIG. 6 is a circuit diagram illustrating an option selector 210, a switching signal control circuit 230 and a feedback adjusting circuit 240 that can be implemented in the control circuit 130 of FIG. 2. The option selector 210 in FIG. 6 includes a voltage comparator 610 and a D-type flip-flop 620. An inverting terminal of the voltage comparator 610 receives the option threshold voltage $V_{THO}$, and a non-inverting terminal of the voltage comparator 610 is coupled to the detection pin LINE. A data input terminal of the D-type flip-flop 620 receives a comparison result of the voltage comparator 610. A clock terminal of the D-type flip-flop 620 receives a power-on signal $T_{SET1}$ of the control circuit 130. A data output terminal of the D-type flip-flop 620 provides the first enable signal EN1, and the inverting data output terminal of the D-type flip-flop 620 provides the second enable signal EN2. Thus, the option selector 210 receives the detected voltage WINE of the detection pin LINE to determine whether, e.g., for the power converter 100, to enter the first mode of operation or the second mode of operation after powering on the control circuit 130 (e.g., when the power-on signal $T_{SET1}$ is enabled).

The feedback adjusting circuit 240 of FIG. 6 includes an error amplifier 660 and is used to adjust and stabilize a voltage of the feedback signal $V_{FB}$. That is, a non-inverting terminal of the error amplifier 660 receives a reference voltage $V_{RV}$, an inverting terminal of the error amplifier 660 receives the feedback signal $V_{FB}$, and an output node of the error amplifier 660 is coupled to the compensation terminal pin COMP and generates an adjusted feedback signal $V_{FB2}$ (e.g., a negative feedback signal), which is a comparison result of the feedback signal $V_{FB}$ and the reference voltage $V_{RV}$.

The switching signal control circuit 230 in FIG. 6 includes an OR gate 630, a voltage comparator 640 and a driving circuit 650. Two input nodes of the OR gate 630 receive the burst control signal SB1 generated by the first mode controller 220 and the burst control signal SB2 generated by the second mode controller 222, respectively. An output node of the OR gate 630 provides a burst operation signal SBM in response to the burst control signals SB1 and SB2. An inverting terminal of the voltage comparator 640 receives a sensing signal Vcs, and a non-inverting terminal of the voltage comparator 640 receives the feedback signal $V_{FB2}$ adjusted by the feedback adjusting circuit 240. The driving circuit 650 generates the switching signal Sw according to the burst operation signal SBM and a comparison result of the voltage comparator 640.

FIG. 7 is a circuit diagram illustrating a first mode controller 220 that can be implemented in the control circuit 130 of FIG. 2. In FIG. 7, the first mode controller 220 includes a first current source IS1, a flip-flop 710, delay circuits 720 and 730, an inverter 740, switches 750 and 760, a voltage selecting circuit 770, a burst control circuit 780 and a line detection circuit 790. An input node of the flip-flop 710 can receive a system supply voltage VCC. A clock node of the flip-flop 710 can receive the first enable signal EN1. An output node of the flip-flop 710 can provide a setting control signal $T_{SET2}$. The setting control signal $T_{SET2}$ can be delayed by the delay circuit 720 to generate a first setting signal $T_{SET2-1}$, and the first setting signal $T_{SET2-1}$ can be delayed by the delay circuit 730 to generate a second setting signal $T_{SET2-2}$. A control node of the switch 750 can receive the first setting signal $T_{SET2-1}$, where a first node of the switch 750 is coupled to the first current source IS1, and a second node of the switch 750 is coupled to the detection pin LINE. A control node of the switch 760 can receive an inverted version of the second setting signal $T_{SET2-2}$ through the inverter 740. Accordingly, the switch 760 connects its two nodes (e.g., is closed) by detecting a falling edge of the second setting signal $T_{SET2-2}$.

As shown in FIG. 7, the voltage selecting circuit 770 includes multiple comparators 771, 772 and 773, a decoder 775, switches 776, 777, 778 and 779, and a voltage adder 774. Non-inverting input terminals of the comparators 771-773 are coupled to the detection pin LINE to receive the voltage applied to the detection pin LINE. Inverting input terminals of the comparators 771-773 are coupled to receive respective threshold voltages $V_{T1}$, $V_{T2}$ and $V_{T3}$. Output nodes of the comparators 771-773 are coupled to respective input nodes of the decoder 775, and multiple output nodes Q1, Q2, Q3 and Q4 of the decoder 775 are respectively coupled to control nodes of switches 776, 777, 778 and 779. The burst control circuit 780 of FIG. 7 includes comparators 781 and 782, an OR gate 785 and a flip-flop 787.

Figure 8:
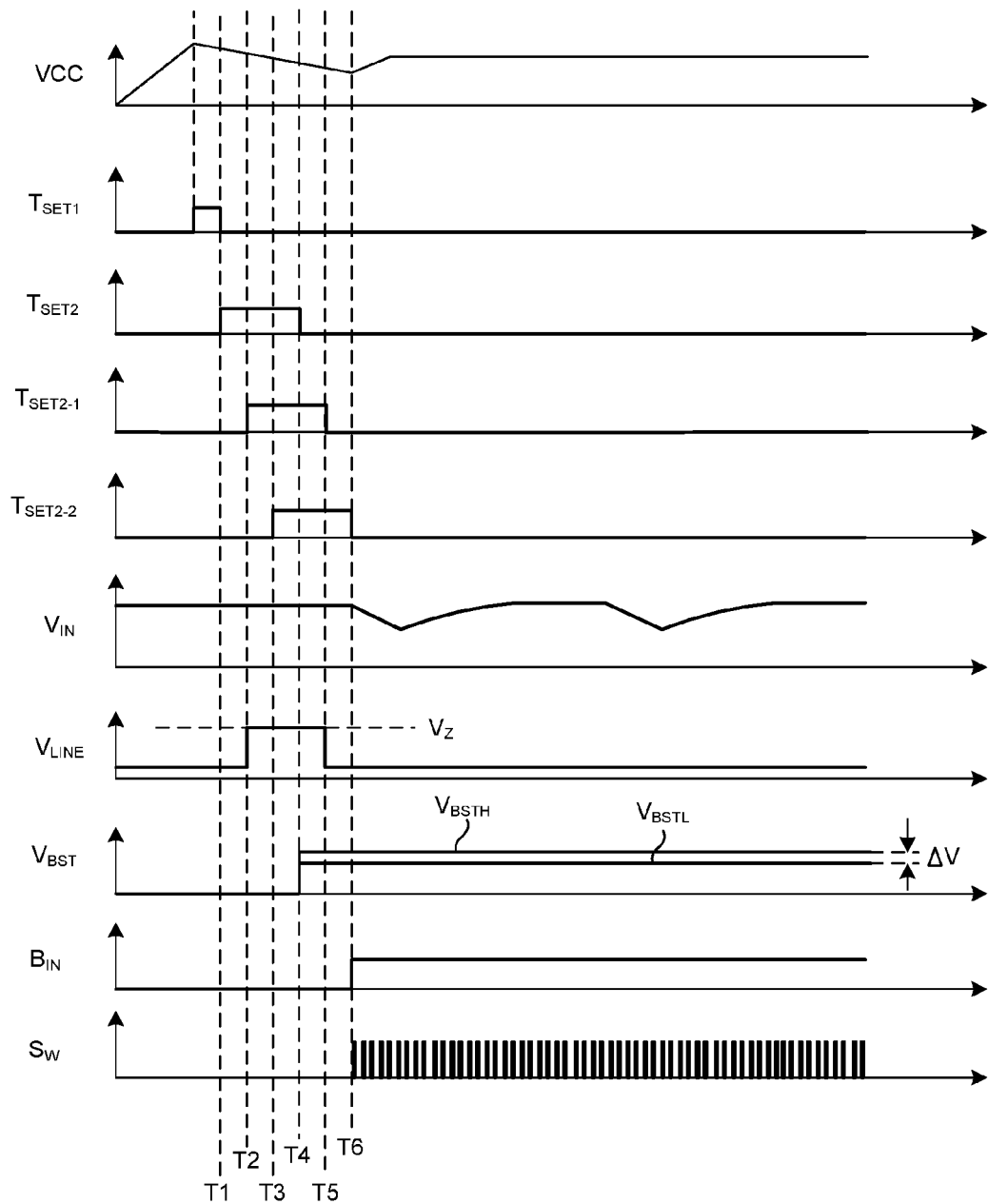
FIG. 8 is a signal timing chart of various signals of the first mode controller of FIG. 7.

FIG. 8 is a signal timing chart illustrating various signals of the circuits shown in, e.g., FIGS. 4, 6 and 7. Referring to FIGS. 4, 6, 7 and 8, at time point T1, the option selector 210 of FIG. 6 will enable the first enable signal EN1 in response to the falling edge of the power-on signal $T_{SET1}$, and the setting control signal $T_{SET2}$ is also enabled at time point T1. At time point T2, the first setting signal $T_{SET2-1}$ is enabled by the delay circuit 720, such that the switch 750 is turned on and the switch 760 is turned off (e.g., due to a delay of the delay circuit 730). As a result, the first current I1 generated by the first current source IS1 flows to the detection pin LINE. In this example, the zener diode Z1 of FIG. 4 will break down during the period of time from the time point T2 to the time point T5 in FIG. 8. In the period of time from the time point T2 to the time point T5, the voltage of the detection pin LINE is the breakdown voltage Vz of the zener diode Z1. The circuits described herein can be designed to allow the breakdown voltage Vz to be larger than a maximum value of the attenuated input voltage Vin(dv).

At time point T3, the second setting signal $T_{SET2-2}$ is enabled by the delay circuit 730. In this example, the delay of the delay circuit 730 is a difference between time point T3 and time point T2. At time point T4, the comparators 771-773 of the voltage selecting circuit 770 produce respective comparison results of the voltage of the detection pin LINE with the threshold voltages $V_{T1}$-$V_{T3}$. The decoder 775 selectively turns on one of the switches 776-779 to connect its two nodes (e.g., close the selected switch) in accordance with the comparison results of the comparators 771-773. Accordingly, the voltage selecting circuit 770 selects the value of the burst-mode threshold in response to the sampled default voltage (e.g., zener breakdown voltage Vz). The value of the burst-mode threshold may be one of the voltage values generated by the voltage sources $V_A$, $V_B$, or $V_C$ in FIG. 7. The burst-mode threshold, in the implementations described herein, can include a burst upper-limit threshold voltage $V_{BSTH}$ and a burst lower-limit threshold voltage $V_{BSTL}$. A selected value of the burst-mode threshold (e.g., selected by the voltage selecting circuit 770) can be used as the burst lower-limit threshold voltage $V_{BSTL}$, and the burst upper-limit threshold voltage $V_{BSTH}$ can be a value that is determined by adding a voltage difference ΔV to the burst lower-limit threshold voltage $V_{BSTL}$ with the voltage adder 774. The burst control circuit 780 can produce the burst control signal SB1 according to the burst upper-limit threshold voltage $V_{BSTH}$, the burst lower-limit threshold voltage $V_{BSTL}$ and the adjusted feedback signal $V_{FB2}$.

At time point T5, due to disabling of the first setting signal $T_{SET2-1}$, the switch 750 is shut off, so as to stop guiding the first current I1 to the detection pin LINE. At time point T6, the switch 760 connects its two nodes by detecting a falling edge of the second setting signal $T_{SET2-2}$, and the line detection circuit 790 will then start operation. The line detection circuit 790 will sense the input voltage Vin by using a divider circuit of the circuit-to-be-measured 140 (e.g., the divider 420 of FIG. 4) connected to the detection pin LINE for generating a brown-in signal Bin to the driving circuit 650 of the switching signal control circuit 230 in FIG. 6. Generally, power converters, such as the power converter 100, are designed to operate between a lower input voltage and an upper input voltage. The brown-in signal Bin can be used to prevent a power converter (e.g., the power converter 100) from operating at an input voltage that is below its associated lower input voltage. If operates at an input voltage that is below its lower input voltage, input current and a duty cycle of PWM signal may be too large, and the power converter may not operate properly. Accordingly, as illustrated in FIG. 8, the switching signal Sw will be generated from the time point T6 in response to the brown-in signal Bin to prevent operation below the lower input voltage for a given implementation.

TABLE 1 below illustrates example relationships (e.g., for the circuits of FIGS. 2, 4, 6 and 7) between the detected voltage $V_{LINE}$, the threshold voltages $V_{T1}$-$V_{T3}$, the breakdown voltage Vz of the zener diode Z1 and the burst upper-limit threshold voltage $V_{BSTH}$/the burst lower-limit threshold voltage $V_{BSTL}$ when the zener diode Z1 breaks down in the period from the time point T2 to the time point T5 in FIG. 8. In TABLE 1, it is assumed that the threshold voltage $V_{T1}$ is larger than the threshold voltage $V_{T2}$, and the threshold voltage $V_{T2}$ is larger than the threshold voltage $V_{T3}$. The breakdown voltage Vz, in this example, should be larger than a value in a range of e.g., 0-5V. In this example, 5V is a maximum value of the aforementioned attenuated input voltage Vin(dv). The voltage difference ΔV is set as 0.1 V.

TABLE 1

| SITUATION | $V_{LINE}$ and $V_{T1}$~$V_{T3}$ | Vz | $V_{BSTH}$/$V_{BSTL}$ |
|---|---|---|---|
| 1 | $V_{LINE}$ > $V_{T1}$ | Open | 0.5 V/0.4 V |
| 2 | $V_{T1}$ > $V_{LINE}$ > $V_{T2}$ | 10 V | 0.75 V/0.65 V |
| 3 | $V_{T2}$ > $V_{LINE}$ > $V_{T3}$ | 7.5 V | 0.9 V/0.8 V |
| 4 | $V_{LINE}$ < $V_{T3}$ | 5.6 V | — |

In situation 1 in TABLE 1, there is no zener diode connected to the detection pin LINE, therefore the breakdown voltage Vz is denoted as open, such that the detected voltage $V_{LINE}$ is larger than the threshold voltage $V_{T1}$. In this situation, the burst upper-limit threshold voltage $V_{BSTH}$/the lower-limit threshold voltage $V_{BSTL}$ is set as 0.5 V/0.4 V. In situation 2 in TABLE 1, the zener diode Z1 is connected to the detection pin LINE with a breakdown voltage Vz equal to 10V, such that the detected voltage $V_{LINE}$ is lower than the threshold voltage $V_{T1}$ and is larger than the threshold voltage $V_{T2}$. In this situation, the burst upper-limit threshold voltage $V_{BSTH}$/ the lower-limit threshold voltage $V_{BSTL}$ is set as 0.75 V/0.65 V. In the situation 3 in TABLE 1, the zener diode Z1 is connected to the detection pin LINE with a breakdown voltage Vz equal to 7.5 V, such that the detected voltage $V_{LINE}$ is lower than the threshold voltage $V_{T2}$ and is larger than the threshold voltage $V_{T3}$. In this situation, the burst upper-limit threshold voltage $V_{BSTH}$/ the lower-limit threshold voltage $V_{BSTL}$ is set as 0.9 V/0.8 V. In the situation 4 in TABLE 1, due to the detected voltage $V_{LINE}$ being lower than the threshold voltage $V_{T3}$ (e.g., the zener diode Z1 being connected to the detection pin LINE with a breakdown voltage Vz equal to 5.6 V, the voltage selecting circuit 770 can disable the burst mode of the power converter 100, e.g., operate without using the burst upper-limit threshold voltage $V_{BSTH}$/the lower-limit threshold voltage $V_{BSTL}$.

FIG. 9 is a circuit diagram illustrating a second mode controller 222 that can be implemented in the control circuit 130 of FIG. 2. The second mode controller 222 includes a second current source IS2, switches 910, 940 and 960, buffer amplifiers 920 and 930, a voltage comparator 980, an AND gate 950, an inverter 951, a voltage adder 970, resistors R91, R92 and R93, diodes D1 and D2, voltage sources Vbst(min), Vmf(max) and Vmf(min), and a burst control circuit 990. Operation of the second mode controller 222 of FIG. 9 is described below with respect to FIG. 10.

Figure 10:
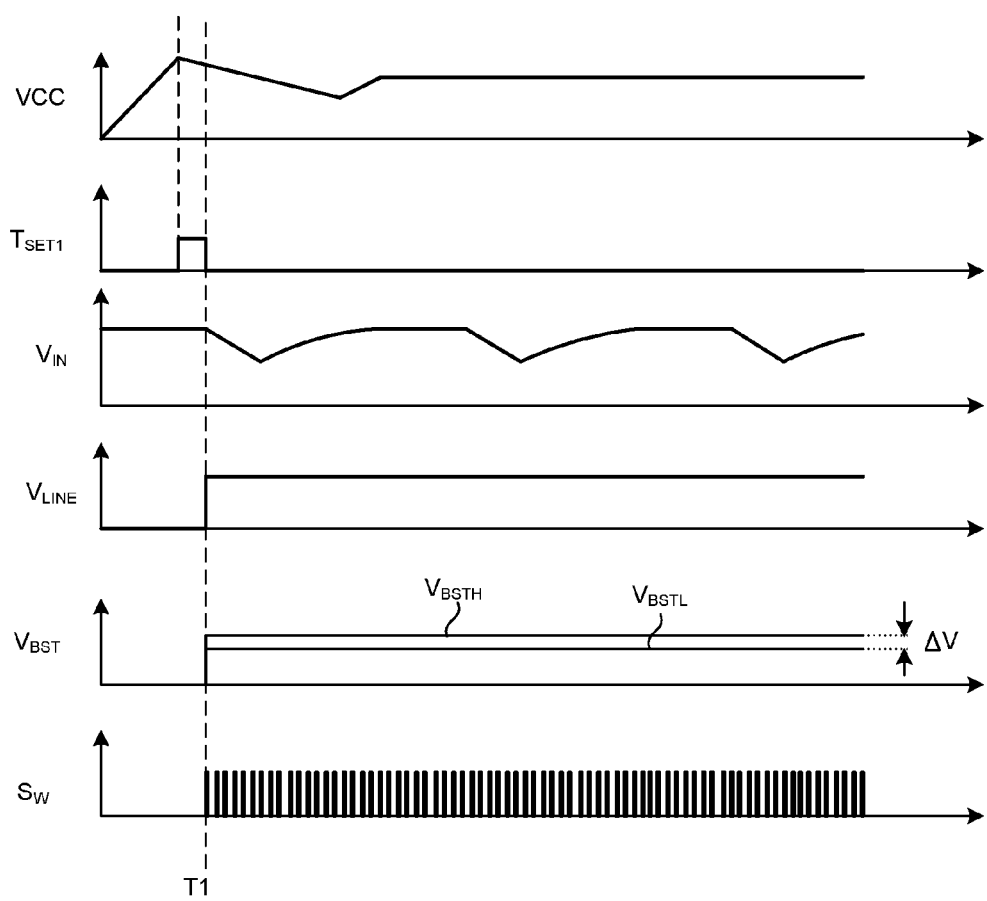
FIG. 10 is a signal timing chart of various signals of the second mode controller of FIG. 9.

FIG. 10 is a signal timing chart of various signals of FIGS. 5, 6 and 9 according to an embodiment of the invention. Referring to FIGS. 5, 6, 9 and 10, at time point T1, the option selector 210 of FIG. 6 enables the second enable signal EN2 in response to the falling edge of the powering-on signal $T_{SET1}$, so as to enter the second mode of operation. The switch 910 is turned on to guide (direct, etc.) the second current I2 generated by the second current source IS2 to the detection pin LINE, so as to obtain an impedance voltage of an impedance element (e.g., the resistor R4 in FIG. 5) from the detection pin LINE. Then, the voltage V1 is generated by the buffer amplifier 920, the resistors R91 and R93, the diode D1, the buffer amplifier 930, and the voltage source Vbst (min), where the voltage V1 is larger than the voltage value Vbst(min). Additionally at time point T1, the switch 940 is turned on by the resistor R92, the voltage sources Vmf(max) and Vmf(min), the voltage comparator 980 and the AND gate 950. Then, the burst lower-limit threshold voltage $V_{BSTL}$ is set as the voltage V1, and the burst upper-limit threshold voltage $V_{BSTH}$ is set as a voltage obtained by adding the voltage difference ΔV to the burst lower-limit threshold voltage $V_{BSTL}$ by the voltage adder 970. The burst control circuit 990 includes the comparators 991, 992 and a flip-flop 995, which generate the burst control signal SB2 in accordance with the burst upper-limit threshold voltage $V_{BSTH}$ and the burst lower-limit threshold voltage $V_{BSTL}$. Referring to FIG. 6, the burst control signal SB2 is provided to generate the burst operation signal SBM for the driving circuit 650 via the OR gate 630 to control the burst operation of the switching signal Sw.

In a first example, a control circuit for a power converter can include a detection pin and an option selector circuit coupled with the detection pin. The option selector circuit can be configured, based on a voltage applied to the detection pin, to generate a first enable signal when the voltage applied to the detection pin is greater than a threshold voltage and generate a second enable signal when the voltage applied to the detection pin is less than the threshold voltage. The control circuit can further include a first mode controller coupled with the option selector circuit and the detection pin. The first mode controller can be configured to, in response to receiving the first enable signal from the option selector circuit, operate the power converter in a first mode of operation. The control circuit can also include a second mode controller coupled with the option selector circuit and the detection pin. The second mode controller can be configured to, in response to receiving the second enable signal from the option selector circuit, operate the power converter in a second mode of operation.

In a second example based on the first example, the first mode controller can include a current supply and a voltage selecting circuit. The first mode of operation can include: supplying, by the current supply, a current to an electrical element coupled with the detection pin; sampling, by the voltage selecting circuit while the current supply is supplying the current, a voltage of the electrical element; setting, by the voltage selecting circuit based on the sampled voltage of the electrical element, a burst-mode threshold voltage of the power converter; and, after setting the burst-mode threshold voltage: disabling the current supply; and performing a detection function that includes monitoring the voltage applied to the detection pin.

In a third example based on the second example, the electrical element can include a zener diode having a first terminal coupled with the detection pin and a second terminal coupled with an electrical ground. The voltage of the electrical element can be a breakdown voltage of the zener diode.

In a fourth example based on the first example, the second mode controller can include a current supply. The second mode of operation can include: supplying, by the current supply, a current to an impedance element coupled with the detection pin; determining, while the current supply is supplying the current, an impedance voltage of the impedance element, the impedance voltage being a voltage across the impedance element; and setting, based on the impedance voltage, a burst-mode threshold voltage of the power converter.

In a fifth example based on the fourth example, the burst-mode threshold voltage can be an initial burst-mode threshold voltage. The second mode of operation can further include, after setting the initial burst-mode threshold voltage: monitoring the impedance voltage, and dynamically changing the initial burst-mode threshold voltage based on the monitoring of the impedance voltage.

In a sixth example based on any one of the fourth or fifth examples, the impedance element can include a resistor having a first terminal coupled with the detection pin and a second terminal coupled with an electrical ground.

In an seventh example based on any one of the first to sixth examples, the control circuit can further include a switching control circuit coupled with the first mode controller and the second mode controller. The switching control circuit can be configured to provide a switching control signal that controls charging of a primary winding of a transformer coupled with the power converter based on a first burst control signal provided by the first mode controller and a second burst control signal provided by the second mode controller.

In an eighth example based on any one of the first to seventh examples, the option selector circuit can include: a comparator having a non-inverting input terminal coupled with the detection pin and an inverting input terminal configured to receive the threshold voltage; and a D-type flip-flop having a data input terminal coupled with an output terminal of the comparator, a clock input terminal configured to receive a power-up signal of the power converter, a non-inverting output terminal coupled with the first mode controller to provide the first enable signal, and an inverting output terminal coupled with the second mode controller to provide the second enable signal.

In a ninth example, a power converter can include a control circuit configured to be coupled with a switch. The control circuit can be further configured to turn the switch on and off to control current flow in a primary winding of a transformer coupled with the power converter. The control circuit can include: a detection pin configured to be coupled with a measurement circuit; and an option selector circuit coupled with the detection pin. The option selector circuit can be configured, based on a voltage applied to the detection pin by the measurement circuit, to select a first mode of operation of the power converter or a second mode of operation of the power converter. The power converter can further include a first mode controller coupled with the option selector circuit and the detection pin, the first mode controller being configured to operate the power converter in the first mode of operation; and a second mode controller coupled with the option selector circuit and the detection pin, the second mode controller being configured to operate the power converter in the second mode of operation.

In a tenth example based on the ninth example, the measurement circuit can include: a resistor divider having a first resistor having a first terminal coupled with an input voltage supply of the power converter and a second terminal coupled with the detection pin; a second resistor having a first terminal coupled with the detection pin and a second terminal coupled with an electrical ground. The measurement circuit can also include a zener diode having a first terminal coupled with the detection pin and a second terminal coupled with the electrical ground. A voltage applied to the detection pin by the resistor divider at power-up of the power converter can cause the option selector circuit to select the first mode of operation.

In an eleventh example based on the tenth example, the first mode controller can include a current supply and a voltage selecting circuit. The first mode of operation can include: supplying, by the current supply, a current to the zener diode; determining, by the voltage selecting circuit while the current supply is supplying the current, a breakdown voltage of the zener diode; setting, by the voltage selecting circuit based on the breakdown voltage of the zener diode, a burst-mode threshold voltage of the power converter; and after setting the burst-mode threshold voltage: disabling the current supply; and performing a detection function that includes monitoring the voltage applied to the detection pin by the resistor divider.

In a twelfth example based on the ninth example, the measurement circuit can include an impedance element having a first terminal coupled with the detection pin and a second terminal coupled with an electrical ground. A voltage applied to the detection pin by the impedance element at power-up of the power converter can cause the option selector circuit to select the second mode of operation.

In a thirteenth example based on the twelfth example, the second mode controller can include a current supply. The second mode of operation can include supplying, by the current supply, a current to the impedance element; determining, while the current supply is supplying the current, an impedance voltage of the impedance element, the impedance voltage being a voltage across the impedance element; and setting, based on the impedance voltage, a burst-mode threshold voltage of the power converter.

In a fourteenth example based on the thirteenth example, the burst-mode threshold voltage can be an initial burst-mode threshold voltage. The second mode of operation can further include, after setting the initial burst-mode threshold voltage: monitoring the impedance voltage; and dynamically changing the initial burst-mode threshold voltage based on the monitoring of the impedance voltage.

In a fifteenth example, based on any one of the ninth to fourteenth examples, the control circuit can be configured to: in response to the voltage applied to the detection pin being above a threshold voltage, provide a first enable signal to the first mode controller to select the first mode of operation; and, in response to the voltage applied to the detection pin being below a threshold voltage, provide a second enable signal to the second mode controller to select the second mode of operation.

In a sixteenth example, a method of controlling a power converter can include: receiving a power-on signal at a control circuit of the power converter; in response to receiving the power-on signal, determining a voltage applied to a detection pin of the control circuit; determining, by the control circuit based on the voltage applied to the detection pin, whether to select a first mode of operation of the power converter or a second mode of operation of the power converter; when the first mode of operation is selected, operating, by a first mode controller of the control circuit, the power converter in the first mode of operation; and when the second mode of operation is selected, operating, by a second mode controller of the control circuit, the power converter in the second mode of operation.

In a seventeenth example based on the sixteenth example, the first mode of operation can include: setting a burst-mode threshold voltage of the power converter; and after setting the burst-mode threshold voltage, performing a detection function that includes monitoring the voltage applied to the detection pin.

In an eighteenth example, based on the sixteenth example, the second mode of operation includes setting a burst-mode threshold voltage of the power converter.

In a nineteenth example, based on the eighteenth example, the burst-mode threshold voltage can be an initial burst-mode threshold voltage. The second mode of operation further can include, after setting the initial burst-mode threshold voltage: dynamically changing the initial burst-mode threshold voltage based on monitoring of a voltage across an impedance element coupled with the detection pin.

In a twentieth example, based on any one of the sixteenth to nineteenth examples, determining whether to select the first mode of operation of the power converter or the second mode of operation of the power converter includes: comparing the voltage applied to the detection pin to a threshold voltage, the first mode of operation being selected if the voltage applied to the detection pin is greater than the threshold voltage, and the second mode of operation being selected if the voltage applied to the detection pin is less than the threshold voltage.

As described herein, a control method for a power converter (and a control circuit for implementing such methods) can include choosing operating modes by detecting a voltage of a detection pin, performing additional functions for setting a burst-mode threshold without increasing the number of pins of the control circuit chip, and still performing a detecting function of the input voltage with the detection pin and a line detection circuit after the burst-mode threshold is setup. In certain implementation, different circuits-to-be-measured can be connected to such a control circuit (e.g., in different conditions) so as to use the control circuit of the power converter flexibly.

The various apparatus and techniques described herein may be implemented using various semiconductor processing and/or packaging techniques. Some embodiments may be implemented using various types of semiconductor processing techniques associated with semiconductor substrates including, but not limited to, for example, Silicon (Si), Gallium Arsenide (GaAs), Gallium Nitride (GaN), Silicon Carbide (SiC), and/or so forth.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps (e.g., providing logic signals) may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A control circuit for a power converter, the control circuit comprising:
   a detection pin;
   an option selector circuit coupled with the detection pin, the option selector circuit being configured to:
      detect one of a first measurement circuit or a second measurement circuit coupled with the detection pin;
      generate a first enable signal if the option selector detects the first measurement circuit; and
      generate a second enable signal if the option selector detects the second measurement circuit;
   a first mode controller coupled with the option selector circuit and the detection pin, the first mode controller being configured to, in response to receiving the first enable signal from the option selector circuit, operate the power converter in a first mode of operation based, at least in part, on a first current applied to the detection pin by the first mode controller; and
   a second mode controller coupled with the option selector circuit and the detection pin, the second mode controller being configured to, in response to receiving the second enable signal from the option selector circuit, operate the power converter in a second mode of operation based, at least in part, on a second current applied to the detection pin by the second mode controller.

2. The control circuit of claim 1, wherein the first mode controller includes a current supply and a voltage selecting circuit, the first mode of operation including:
   supplying, by the current supply, the first current to an electrical element coupled with the detection pin, the electrical element being included in the first measurement circuit;
   sampling, by the voltage selecting circuit while the current supply is supplying the first current, a voltage of the electrical element;
   setting, by the voltage selecting circuit based on the sampled voltage of the electrical element, a burst-mode threshold voltage of the power converter; and
   after setting the burst-mode threshold voltage:
      disabling the current supply; and
      performing a detection function that includes monitoring the voltage applied to the detection pin.

3. The control circuit of claim 2, wherein:
   the electrical element includes a Zener diode having a first terminal coupled with the detection pin and a second terminal coupled with an electrical ground; and
   the voltage of the electrical element is a breakdown voltage of the Zener diode.

4. The control circuit of claim 1, wherein the second mode controller includes a current supply, the second mode of operation including:

supplying, by the current supply, the second current to an impedance element coupled with the detection pin, the impedance element being included in the second measurement circuit;
determining, while the current supply is supplying the second current, an impedance voltage of the impedance element, the impedance voltage being a voltage across the impedance element; and
setting, based on the impedance voltage, a burst-mode threshold voltage of the power converter.

5. The control circuit of claim 4, wherein the burst-mode threshold voltage is an initial burst-mode threshold voltage, the second mode of operation further including, after setting the initial burst-mode threshold voltage:
   monitoring the impedance voltage; and
   dynamically changing the initial burst-mode threshold voltage based on the monitoring of the impedance voltage.

6. The control circuit of claim 4, wherein the impedance element includes a resistor having a first terminal coupled with the detection pin and a second terminal coupled with an electrical ground.

7. The control circuit of claim 1, further comprising a switching control circuit coupled with the first mode controller and the second mode controller,
   the switching control circuit being configured to provide a switching control signal that controls charging of a primary winding of a transformer coupled with the power converter based on a first burst control signal provided by the first mode controller and a second burst control signal provided by the second mode controller.

8. The control circuit of claim 1, wherein the option selector circuit includes:
   a comparator having a non-inverting input terminal coupled with the detection pin and an inverting input terminal configured to receive a threshold voltage; and
   a D-type flip-flop having a data input terminal coupled with an output terminal of the comparator, a clock input terminal configured to receive a power-up signal of the power converter, a non-inverting output terminal coupled with the first mode controller to provide the first enable signal, and an inverting output terminal coupled with the second mode controller to provide the second enable signal.

9. A power converter comprising:
   a control circuit configured to be coupled with a switch, the control circuit being further configured to turn the switch on and off to control current flow in a primary winding of a transformer coupled with the power converter; the control circuit including:
      a detection pin configured to be coupled with a measurement circuit;
      an option selector circuit coupled with the detection pin, the option selector circuit being configured to select a first mode of operation of the power converter when the measurement circuit is a first measurement circuit, or a second mode of operation of the power converter when the measurement circuit is a second measurement circuit;
      a first mode controller coupled with the option selector circuit and the detection pin, the first mode controller being configured to operate the power converter in the first mode of operation based, at least in part, on a first current applied to the detection pin by the first mode controller; and
      a second mode controller coupled with the option selector circuit and the detection pin, the second mode controller being configured to operate the power converter in the second mode of operation based, at least in part, on a second current applied to the detection pin by the second mode controller.

10. The power converter of claim 9, wherein the first measurement circuit includes:
a resistor divider having:
a first resistor having a first terminal coupled with an input voltage supply of the power converter and a second terminal coupled with the detection pin; and
a second resistor having a first terminal coupled with the detection pin and a second terminal coupled with an electrical ground; and
a Zener diode having a first terminal coupled with the detection pin and a second terminal coupled with the electrical ground,
a voltage applied to the detection pin by the resistor divider at power-up of the power converter causing the option selector circuit to select the first mode of operation.

11. The power converter of claim 10, wherein the first mode controller includes a current supply and a voltage selecting circuit, the first mode of operation including:
supplying, by the current supply, the first current to the Zener diode;
determining, by the voltage selecting circuit while the current supply is supplying the first current, a breakdown voltage of the Zener diode;
setting, by the voltage selecting circuit based on the breakdown voltage of the Zener diode, a burst-mode threshold voltage of the power converter; and
after setting the burst-mode threshold voltage:
disabling the current supply; and
performing a detection function that includes monitoring the voltage applied to the detection pin by the resistor divider.

12. The power converter of claim 9, wherein the second measurement circuit includes:
an impedance element having a first terminal coupled with the detection pin and a second terminal coupled with an electrical ground,
a voltage applied to the detection pin by the impedance element at power-up of the power converter causing the option selector circuit to select the second mode of operation.

13. The power converter of claim 12, wherein the second mode controller includes a current supply, the second mode of operation including:
supplying, by the current supply, the second current to the impedance element;
determining, while the current supply is supplying the second current, an impedance voltage of the impedance element, the impedance voltage being a voltage across the impedance element; and
setting, based on the impedance voltage, a burst-mode threshold voltage of the power converter.

14. The power converter of claim 13, wherein the burst-mode threshold voltage is an initial burst-mode threshold voltage, the second mode of operation further including, after setting the initial burst-mode threshold voltage:
monitoring the impedance voltage; and
dynamically changing the initial burst-mode threshold voltage based on the monitoring of the impedance voltage.

15. The power converter of claim 9, wherein the control circuit is configured to:
in response to a voltage applied to the detection pin being above a threshold voltage, provide a first enable signal to the first mode controller to select the first mode of operation; and
in response to a voltage applied to the detection pin being below the threshold voltage, provide a second enable signal to the second mode controller to select the second mode of operation.

16. A method of controlling a power converter, the method comprising:
receiving a power-on signal at a control circuit of the power converter;
in response to receiving the power-on signal, detecting one of a first measurement circuit or a second measurement circuit coupled with a detection pin of the control circuit;
selecting, by the control circuit, a first mode of operation of the power converter when the first measurement circuit is detected, or a second mode of operation of the power converter when the second measurement circuit is detected;
when the first mode of operation is selected, operating, by a first mode controller of the control circuit, the power converter in the first mode of operation based, at least in part, on a first current applied to the detection pin by the first mode controller; and
when the second mode of operation is selected, operating, by a second mode controller of the control circuit, the power converter in the second mode of operation based, at least in part, on a second current applied to the detection pin by the second mode controller.

17. The method of claim 16, wherein the first mode of operation includes:
setting a burst-mode threshold voltage of the power converter; and
after setting the burst-mode threshold voltage, performing a detection function that includes monitoring a voltage applied to the detection pin.

18. The method of claim 16, wherein the second mode of operation includes:
setting a burst-mode threshold voltage of the power converter.

19. The method of claim 18, wherein the burst-mode threshold voltage is an initial burst-mode threshold voltage, the second mode of operation further including, after setting the initial burst-mode threshold voltage:
dynamically changing the initial burst-mode threshold voltage based on monitoring of a voltage across an impedance element coupled with the detection pin, the impedance element being included in the second measurement circuit.

20. The method of claim 16, wherein selecting the first mode of operation of the power converter or the second mode of operation of the power converter includes:
comparing a voltage applied to the detection pin to a threshold voltage,
the first mode of operation being selected if the voltage applied to the detection pin is greater than the threshold voltage, and
the second mode of operation being selected if the voltage applied to the detection pin is less than the threshold voltage.

* * * * *